United States Patent
Min et al.

(10) Patent No.: US 8,862,843 B2
(45) Date of Patent: Oct. 14, 2014

(54) STORAGE SYSTEM, BACKUP STORAGE APPARATUS, AND BACKUP CONTROL METHOD

(75) Inventors: Zhongzhong Min, Kawasaki (JP); Koji Uchida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 703 days.

(21) Appl. No.: 12/684,016

(22) Filed: Jan. 7, 2010

(65) Prior Publication Data
US 2010/0180094 A1    Jul. 15, 2010

(30) Foreign Application Priority Data

Jan. 9, 2009    (JP) .................. 2009-003978

(51) Int. Cl.
G06F 13/00    (2006.01)
G06F 11/20    (2006.01)

(52) U.S. Cl.
CPC ........ G06F 11/2058 (2013.01); G06F 11/2074 (2013.01); G06F 11/2066 (2013.01); G06F 11/2064 (2013.01)
USPC .................. 711/162; 711/E12.002

(58) Field of Classification Search
USPC ........................................ 711/162
See application file for complete search history.

(56) References Cited

U.S. PATENT DOCUMENTS

| | | | |
|---|---|---|---|
| 7,434,094 B2 * | 10/2008 | Fujita et al. | 714/6.22 |
| 7,529,899 B2 | 5/2009 | Deguchi et al. | |
| 2004/0230742 A1 * | 11/2004 | Ikeuchi et al. | 711/112 |
| 2006/0048014 A1 | 3/2006 | Takahashi et al. | |
| 2006/0064558 A1 | 3/2006 | Cochran et al. | |
| 2006/0212668 A1 * | 9/2006 | Furukawa et al. | 711/162 |
| 2006/0248381 A1 * | 11/2006 | Fujita et al. | 714/6 |
| 2007/0174567 A1 | 7/2007 | Deguchi et al. | |

FOREIGN PATENT DOCUMENTS

| | | |
|---|---|---|
| JP | 2003-099306 A | 4/2003 |
| JP | 2003-167684 A | 6/2003 |
| JP | 2006-72635 A | 3/2006 |
| JP | 2006-92535 A | 4/2006 |
| JP | 2006-260292 A | 9/2006 |
| JP | 2007-199920 A | 8/2007 |

OTHER PUBLICATIONS

Japan Patent Office, Office Action mailed Nov. 30, 2010 in corresponding JP Patent Application No. 2009-003978, with partial English-language translation.

* cited by examiner

Primary Examiner — Sean D Rossiter
(74) Attorney, Agent, or Firm — Fujitsu Patent Center

(57) ABSTRACT

A storage system includes a first storage apparatus and a second storage apparatus including a second controller for sequentially transferring a copy of the part of the segments of data from a second buffer into a second storage device segment by segment in the same sequence as the second buffer have received a copy of the part of segments of data from a first buffer of the first storage apparatus. The second controller producing a backup copy in a backup data storage portion by copying a copy of one of the segments of the data stored in the second storage device that has been transferred from the second buffer into the second storage device while transferring a copy of the subsequent segment of the data next to said one of the segments of the data in the sequence from the second buffer to the second storage device.

13 Claims, 20 Drawing Sheets

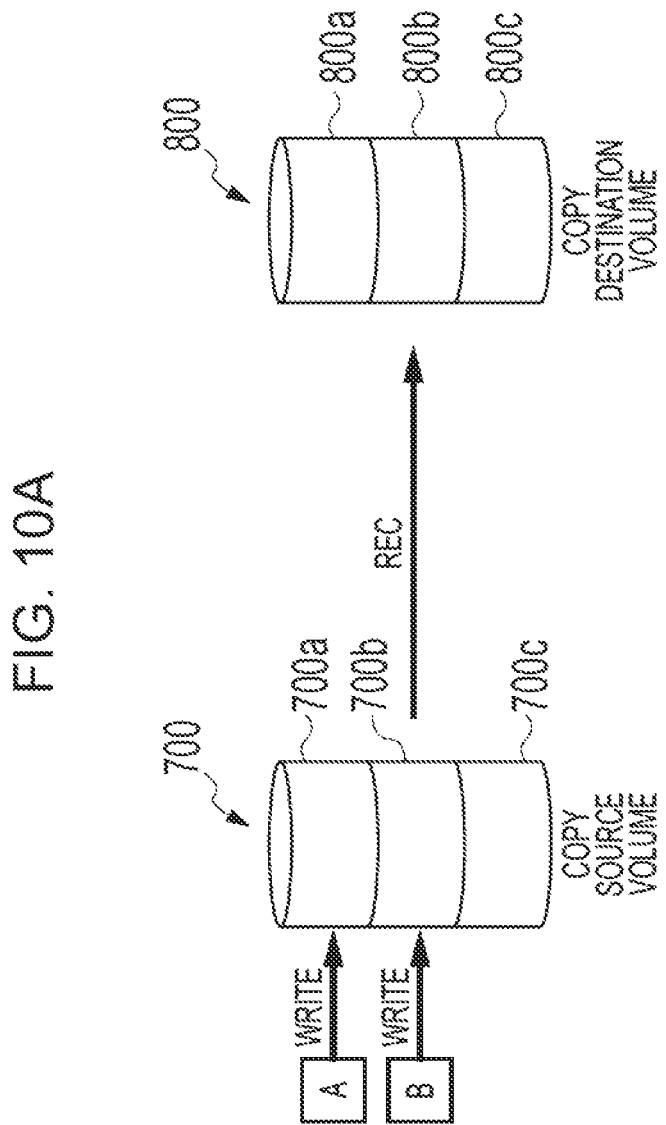

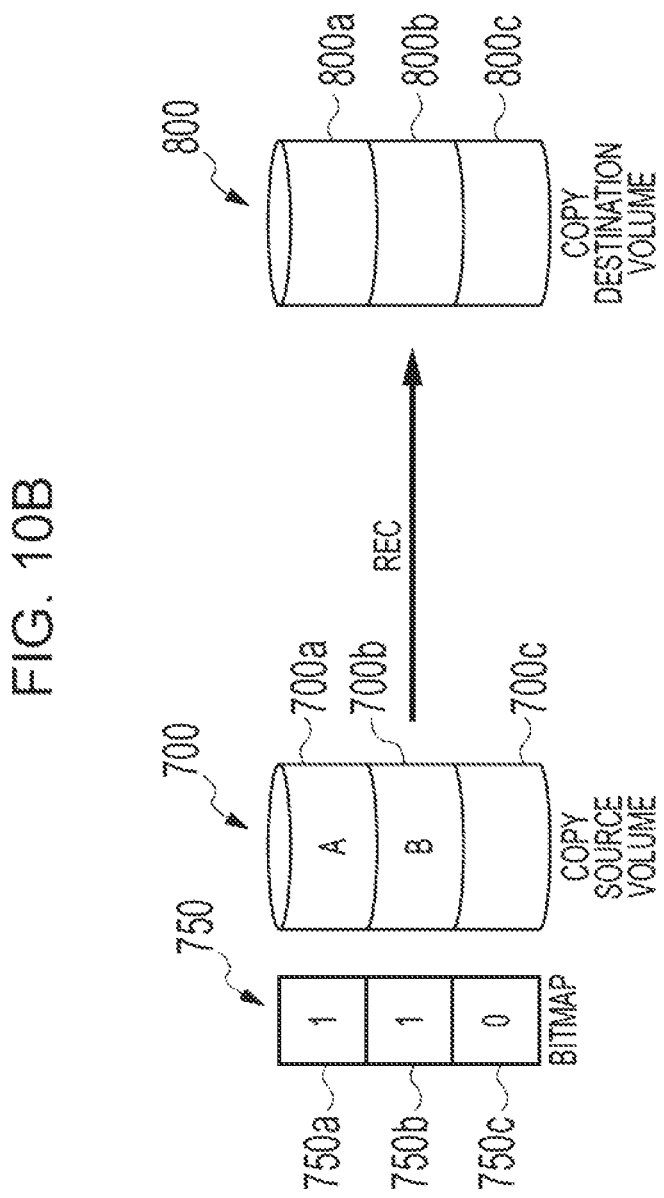

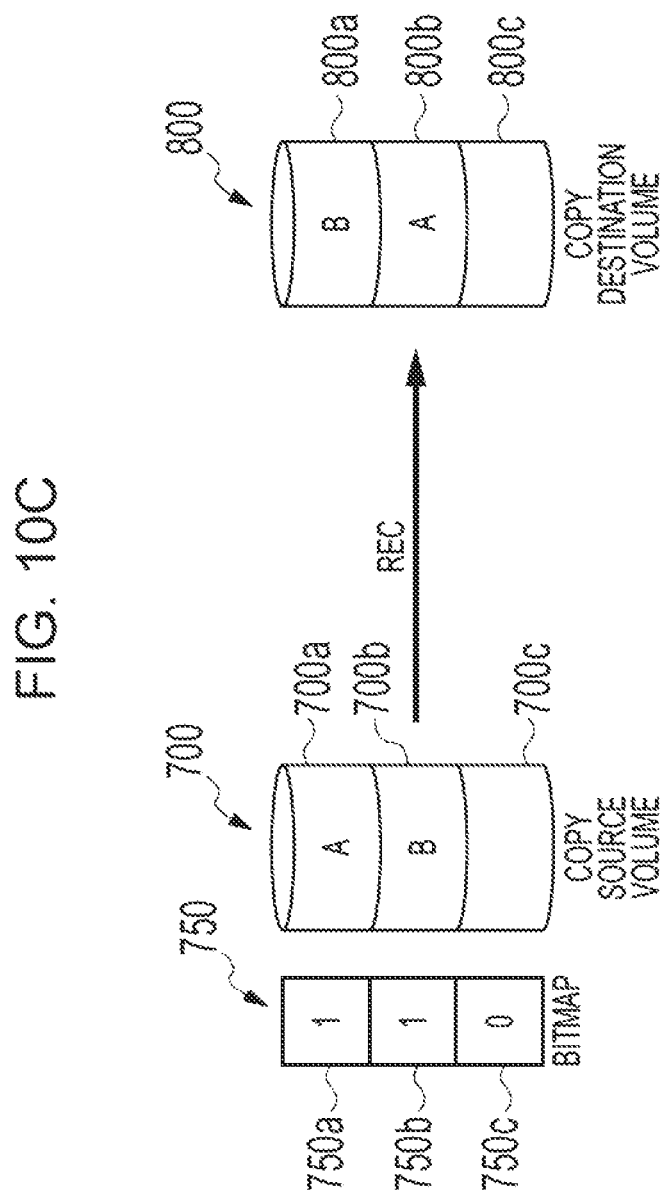

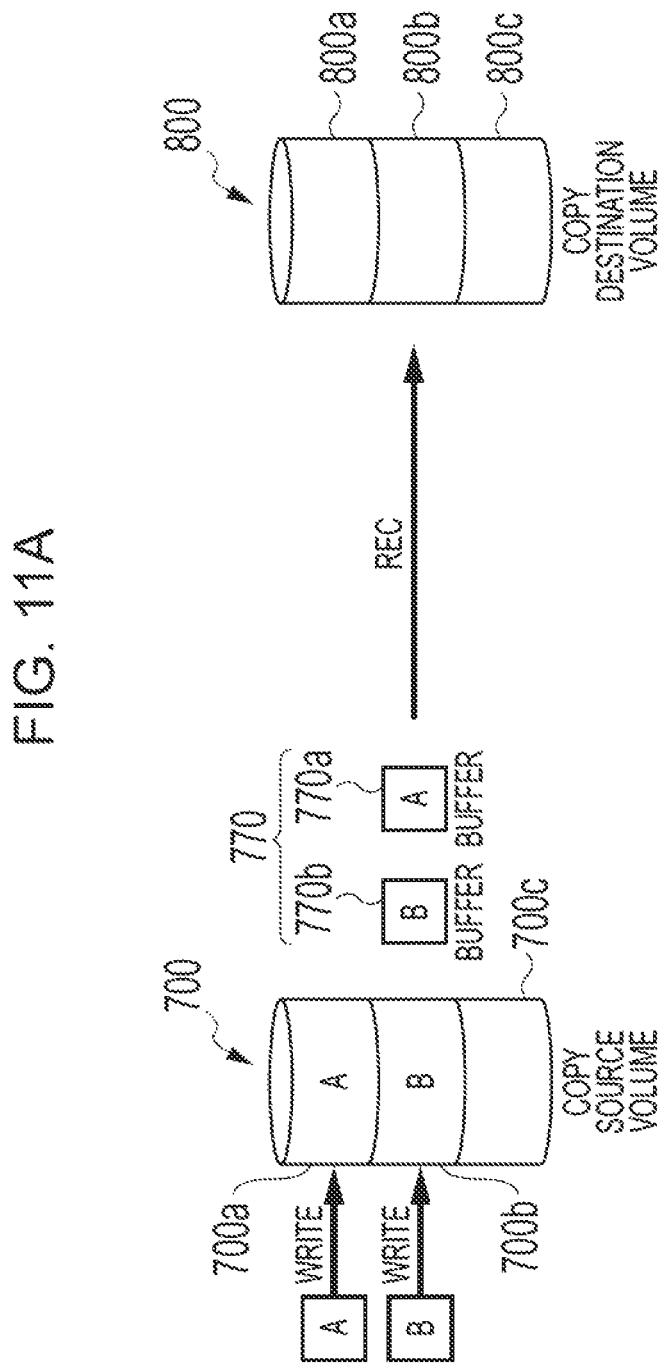

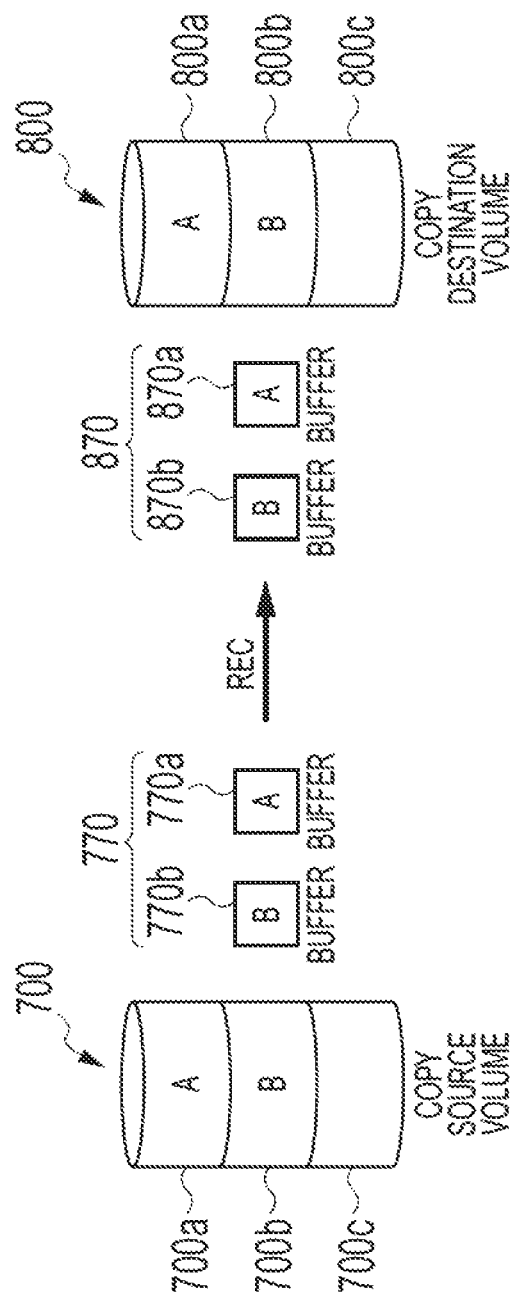

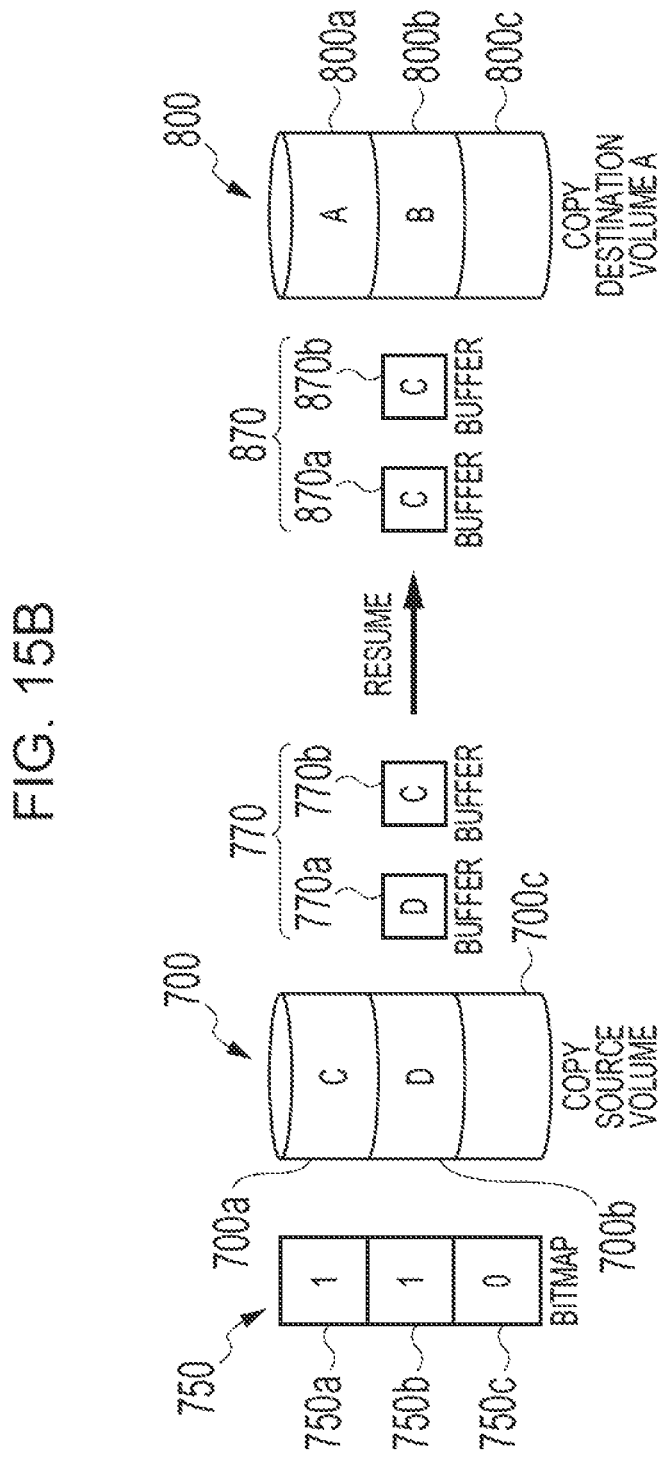

STORAGE SYSTEM, BACKUP STORAGE APPARATUS, AND BACKUP CONTROL METHOD

CROSS-REFERENCE TO RELATED APPLICATIONS

This application is based upon and claims the benefit of priority of the prior Japanese Patent Application No. 2009-003978, filed on Jan. 9, 2009, the entire contents of which are incorporated herein by reference.

FIELD

The embodiments discussed herein are related to a storage system, a backup storage apparatus, and a backup control method.

BACKGROUND

Conventionally, there has been known a Remote Equivalent Copy method (REC) as a function of protecting data from disasters, terrorism attacks, and the like and quickly restoring data. The REC is, specifically, a function of copying data stored in a storage apparatus to another storage apparatus installed in a remote site.

Meanwhile, the storage apparatus controls the sequence in which data is written to a disk in such a manner that even if writing to the disk suddenly stops, for example, due to a crash of the sever OS (Operating System), data may be restored to its original state. Such a writing sequence control is also performed in a storage apparatus of a copy destination (hereinafter referred to simply as a "copy destination") in the same manner when the REC is performed. For this reason, in order for the copy destination to restore data received from a storage apparatus of a copy source (hereinafter referred to simply as a "copy source") to the same state as that of the copy source, the sequence (transfer sequence) in which data is copied from the copy source to the copy destination is requested to be the same as the sequence in which data is written to the copy source.

As the method of guaranteeing the sequence in which data is written to a copy destination, there is a method by which copy data to be transferred to the copy destination is temporarily stored in a buffer and the data in the buffer is collectively transferred to the copy destination in a predetermined timing.

There is Japanese Laid-Open Patent Publication No. 2006-260292 as a reference document.

SUMMARY

According to an aspect of the embodiment, a storage system includes a first storage apparatus for storing data that have been sequentially updated, and a second storage apparatus for storing a copy of the data stored in the first storage apparatus, the first storage apparatus includes a first storage device for storing a plurality of segments of data that have been sequentially updated segment by segment, a first buffer for receiving a copy of the data from the first storage device and sending out the copy of the data to the second storage apparatus, and a first controller for sequentially transferring a copy of a part of the segments of the data from the first storage device into the first buffer segment by segment in the same sequence as the segments of data have been updated in the first storage device and for controlling the first buffer to sequentially sending out the copy of the part of the segments of the data to the second storage apparatus segment by segment in the same sequence as the copy of the segments of data have been transferred to the first buffer, the second storage apparatus includes a second storage device for storing a copy of the segments of the data stored in the first storage apparatus, the second storage device including a backup data storage portion for storing a backup copy of the segments of the data, a second buffer for receiving the copy of the part of the segments of the data from the first buffer of the first storage apparatus and transferring the copy of the part of the segments of the data to the second storage device, and a second controller for sequentially transferring the copy of the part of the segments of the data from the second buffer into the second storage device segment by segment in the same sequence as the second buffer have received the copy of the part of the segments of the data from the first buffer, the second controller producing a backup copy in the backup data storage portion by copying a copy of one of the segments of the data stored in the second storage device that has been transferred from the second buffer into the second storage device while transferring a copy of the subsequent segment of the data next to said one of the segments of the data in the sequence from the second buffer to the second storage device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 10A illustrates a state in which data is written to a copy source volume.

FIG. 10B illustrates a state in which the copy source creates a bitmap as the data is written.

FIG. 10C illustrates a state in which data writing sequentiality is not guaranteed.

FIG. 11A illustrates a state in which data written to the copy source volume is stored in a buffer.

FIG. 11B illustrates a state in which data is stored in the copy destination volume.

FIG. 15B illustrates a state in which when the remote copy is resumed, update data is backed up to the copy destination in a sequence different from the sequence in which data is written to the copy source.

DESCRIPTION OF EMBODIMENTS

Figure 1:
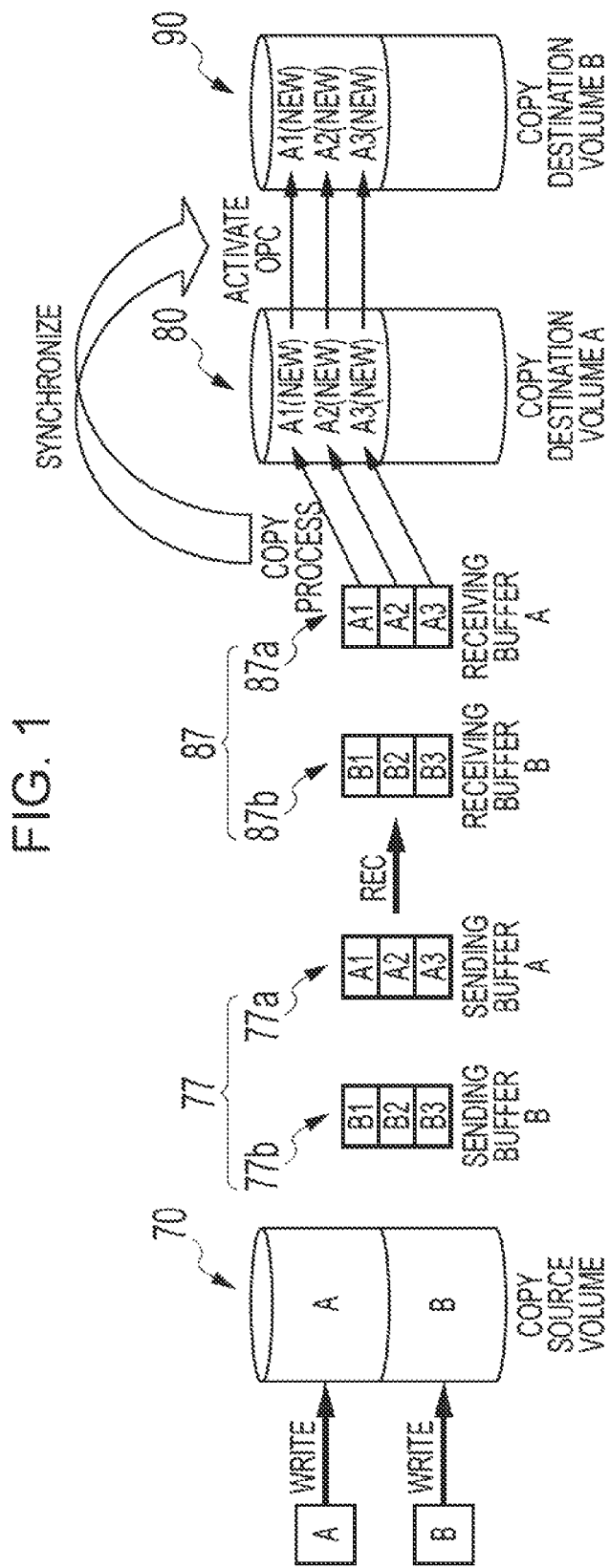
FIG. 1 illustrates a process flow of a storage system.

Hereinafter, by referring to accompanying drawings, embodiments in accordance with a backup control apparatus, a storage system, a backup control program, and a backup control method disclosed in the present technique will be described in detail.

First, the storage system in accordance with the comparison embodiment will be described by referring to drawings.

Hereinafter, a data transfer method will be specifically described by comparing a case in which the sequence in which data is written to a copy destination is not guaranteed. First, the case in which the sequentiality is not guaranteed will be described by referring to FIGS. 10A to 10C. FIG. 10A illustrates a state in which data is written to a copy source volume; FIG. 10B illustrates a state in which the copy source creates a bitmap as the data is written; and FIG. 10C illustrates a state in which the sequence in which data is written to the copy source does not match the sequence in which data is backed up to the copy destination.

While the REC is being activated, as illustrated in FIG. 10A, a session is established between a copy source volume 700 and a copy destination volume 800. At this time, when an instruction to write data A to a region 700a of the copy source volume 700 and an instruction to write data B to a region 700b thereof are received, the copy source writes the data A and B to the region 700a and the region 700b respectively as illustrated in FIG. 10B. Then, the copy source creates a bitmap 750 indicating which region of the volume 700 is updated. Specifically, the copy source sets "1" or "0" to each of the regions 750a to 750c of the bitmap 750 in such a manner that "1" is set to the values of the regions 750a and 750b corresponding to the respective regions 700a and 700b of the volume 700 where data is updated, and "0" is set to the value of the region 750c corresponding to the region 700c of the volume 700 where data is not updated.

Then, the copy source transfers the updated data to the copy destination. Specifically, the copy source refers to each of the regions 750a to 750c of the bitmap 750 to determine in which region of the volume 700, data is updated, and transfers only the data stored in the updated region to the copy destination. However, the copy method using the bitmap 750 may not control the sequence in which these updates occur when data is updated in a plurality of regions of the volume 700. For this reason, the copy source checks each of the regions 750a to 750c of the bitmap 750 to find a region (having a value of "1") where data is updated, and each time the region is found, the copy source transfers the data stored in the region of the volume 700 corresponding to the region to the copy destination.

By performing such a process, the copy source may determine that data is updated in the sequence from data B to data A although the data is written in the sequence from data A to data B. In that case, as illustrated in FIG. 10C, the copy source transfers data in the sequence from data B to data A. Therefore, data is written in the sequence from data B to data A in a copy destination volume 800. As a result, the data sequentiality may not be maintained between the copy source and the copy destination. Accordingly, it is difficult to execute a restore using the data stored in the copy destination.

Alternatively, there is a method by which a buffer is used to guarantee the sequence of writing data to the copy source before transferring data. Hereinafter, such a data transfer method will be described. FIG. 11A illustrates a state in which data written to the copy source volume is stored in a buffer; and FIG. 11B illustrates a state in which data which the copy destination receives from the copy source and stores in the buffer is stored in the copy destination volume.

As illustrated in FIG. 11A, when data A and data B are written to the sequence from data A to data B in the copy source volume 700, the copy source stores data A and data B in buffer segments 770a and 770b respectively in the same written sequence. Then, when these buffer segments 770a and 770b (hereinafter referred to simply as "buffers 770a and 770b") become full or a specific time has elapsed since storing of data started, the copy source transfers data stored in these buffers 770a and 770b to the copy destination collectively in units of buffers.

Then, as illustrated in FIG. 11B, when data is received from the copy source in units of buffers, the copy destination stores the data in buffer segments 870a and 870b (hereinafter referred to simply as "buffers 870a and 870b") in the received sequence. Then, the copy destination transfers the data to the volume 800 in the sequence from buffer 870a to buffer 870b and stores the data in the volume 800. This method allows the copy destination to always write the data received from the copy source to its own volume 800 in the same sequence as the data was written to the copy source.

Figure 12:
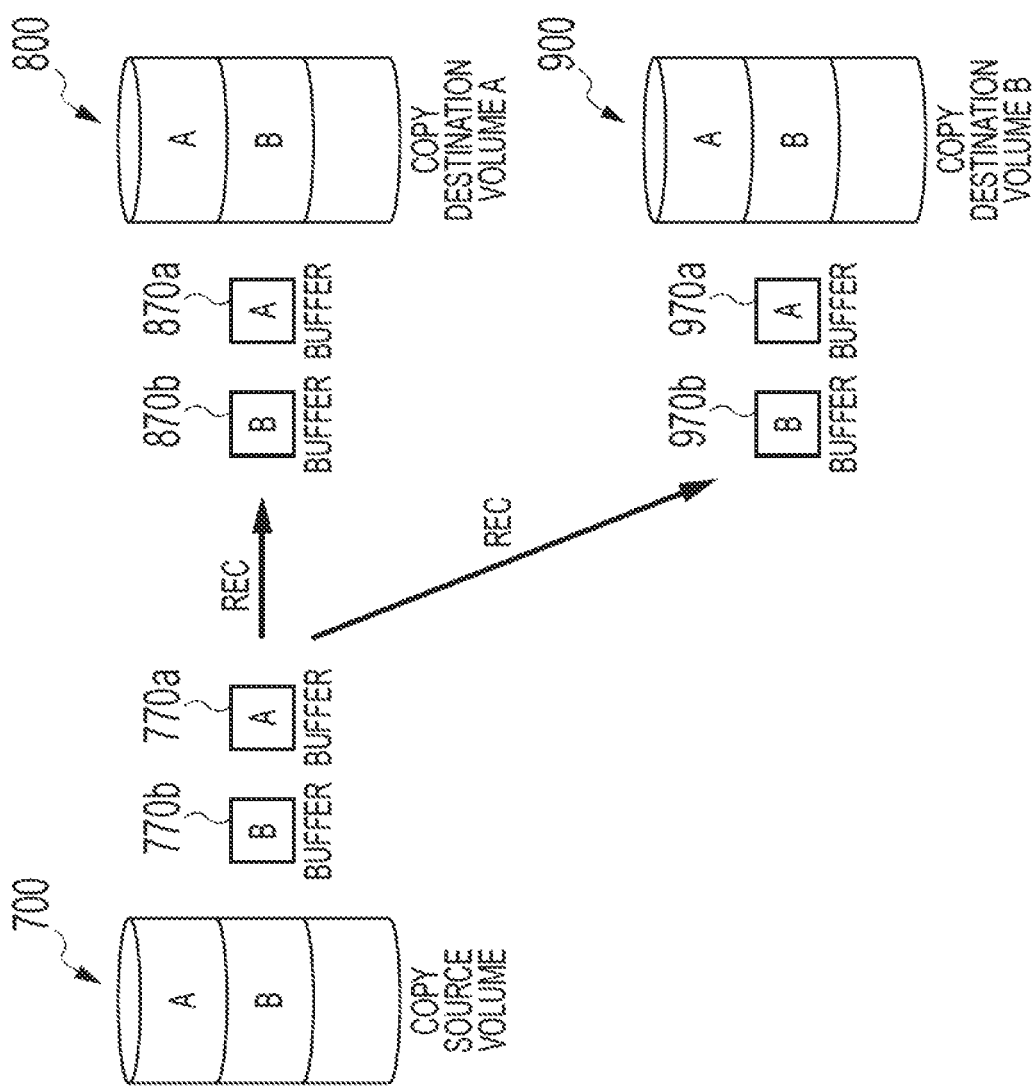
FIG. 12 illustrates a state in which copy data is transferred from the copy source to two volumes of the copy destination.

Further, in recent years, in order to protect data more reliably, dual backups may sometimes be performed on copy source data. At this time, as illustrated in FIG. 12, the copy source volume 700 transfers the update data to buffers 870a, 870b, 970a, and 970b through the buffers 770a and 770b, and the update data A and B are stored in two volumes (volume A 800 and volume B 900) of the copy destination. This method gives a large load to the communication line and thus may reduce data transfer efficiency. In light of this, such reduction of transfer efficiency may be prevented by backing up data acquired from the copy source in the copy destination.

As one of the backup methods by which dual backups are performed in the copy destination as described above, there may be considered a method in which dual backups are performed in the copy destination by temporarily suspending the REC from the copy source to the copy destination.

Figure 13:
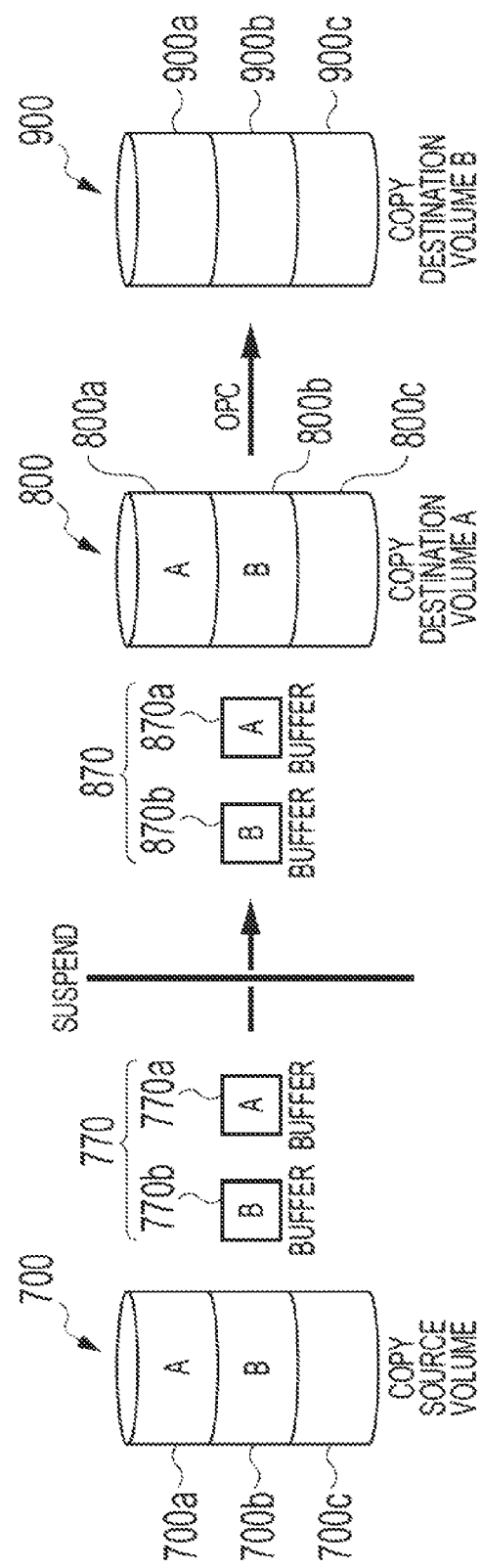
FIG. 13 illustrates a state in which a remote copy is suspended when dual backups of data are performed in the copy destination.

More specifically, when the update data of the copy source is backed up to two volumes of the copy destination, as illustrated in FIG. 13, the copy destination first stores the data A and data B transmitted in units of buffers, in regions 800a and 800b each corresponding to the data A and B in the volume A 800. Then, the copy destination backs up the data A and data B stored in the volume A 800 to another volume B 900 which is also provided in the copy destination using an One Point Copy method (OPC). The OPC is a method of generating replicated data (snapshot) at a predetermined point of time of the data to be backed up when a backup is performed. However, if the REC is suspended, following problems may occur.

Figure 14:
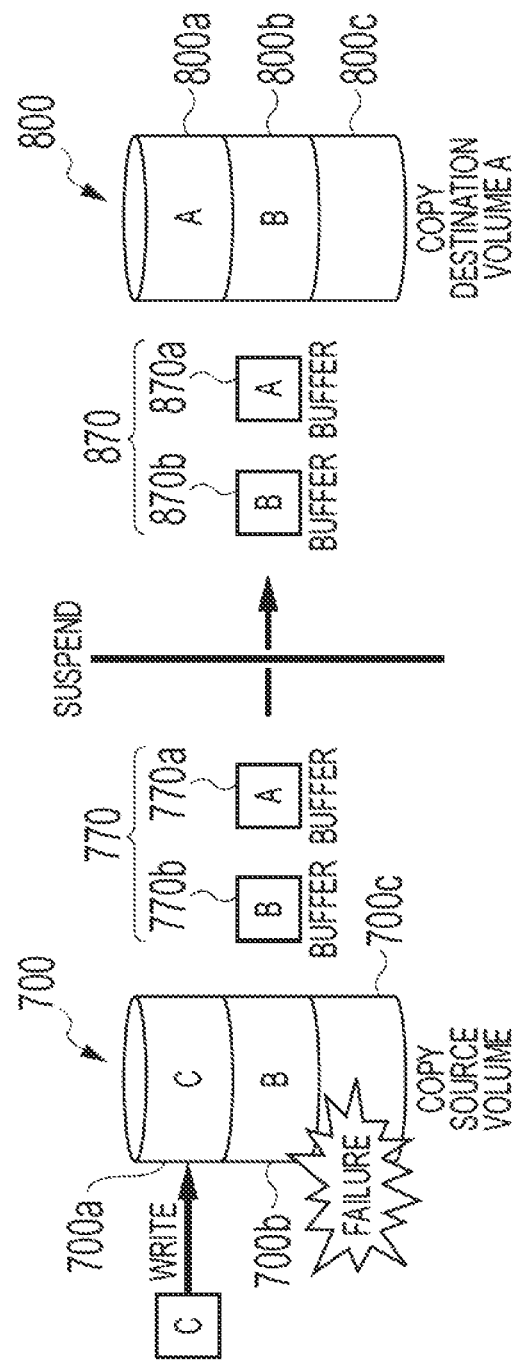
FIG. 14 illustrates a case in which the copy source volume fails while a remote copy using REC is being suspended.

For example, assume that as illustrated in FIG. 14, while a remote copy using REC is being suspended, data C is newly written to a region 700a of the copy source volume 700, and subsequently the copy source volume 700 fails due to an earthquake or the like. In this case, the data C is not transferred to the copy destination because the REC is suspended. Accordingly, if the copy source volume 700 fails while the remote copy using REC is being suspended, data that has been written from when REC was suspended to when the copy source volume failed is lost, and thus it may be difficult to restore the data.

Figure 15A:
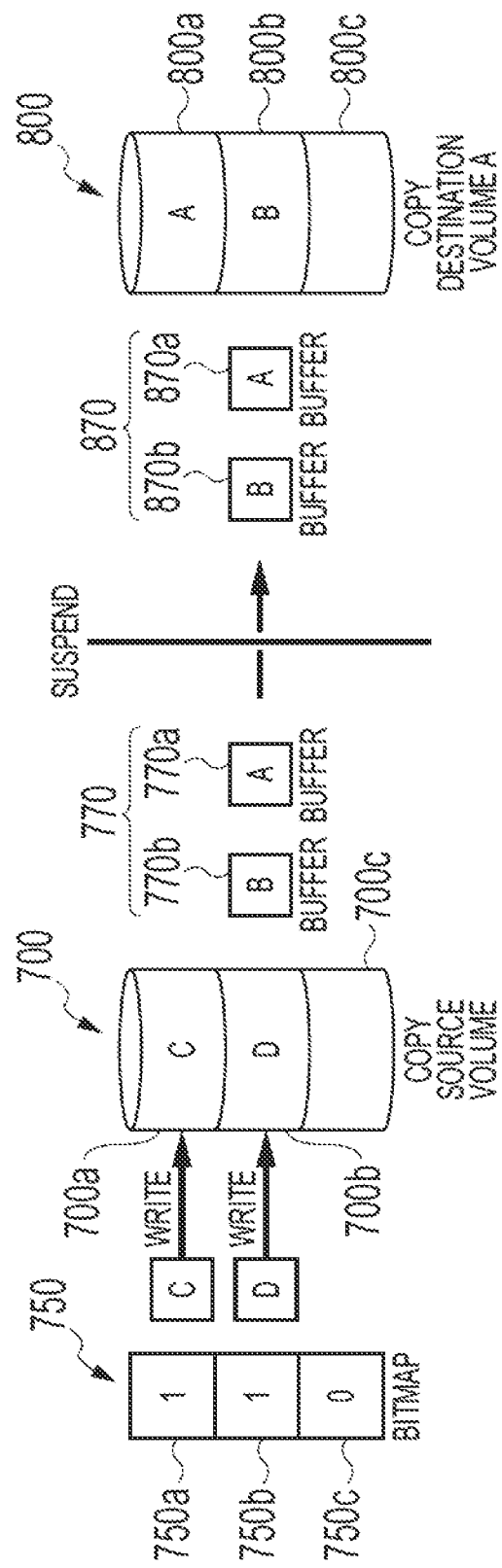
FIG. 15A illustrates a state in which data is written to the copy source while the remote copy using REC is being suspended.

Alternatively, when data C and data D are written to the volume 700 while the remote copy using REC is being suspended, the copy source controls these writes using a bitmap 750 instead of recording buffers as illustrated in FIG. 15A. Then, when the remote copy is resumed, the copy source checks the bitmap 750 and stores the data C and data D in buffers 770a and 770b respectively in the sequence determined to be updated. For this reason, as illustrated in FIG. 15B, there may occur a case where the sequence in which data C and data D are written to the volume 700 does not match the sequence in which data C and data D are transferred to the copy destination.

As described above, it is not preferable in operation to suspend the remote copy using REC. Therefore, it is preferable not to suspend the remote copy when dual backups are to be performed in the copy destination. However, when dual backups are to be performed without suspending the remote copy, the aforementioned data transfer method may not synchronize between the copy process of transferring data stored in the buffer 870 to the volume A 800 and the process of backing up data stored in the volume A 800 to the volume B 900 in the copy destination. Accordingly, backup data may be meaningless.

Figure 16:
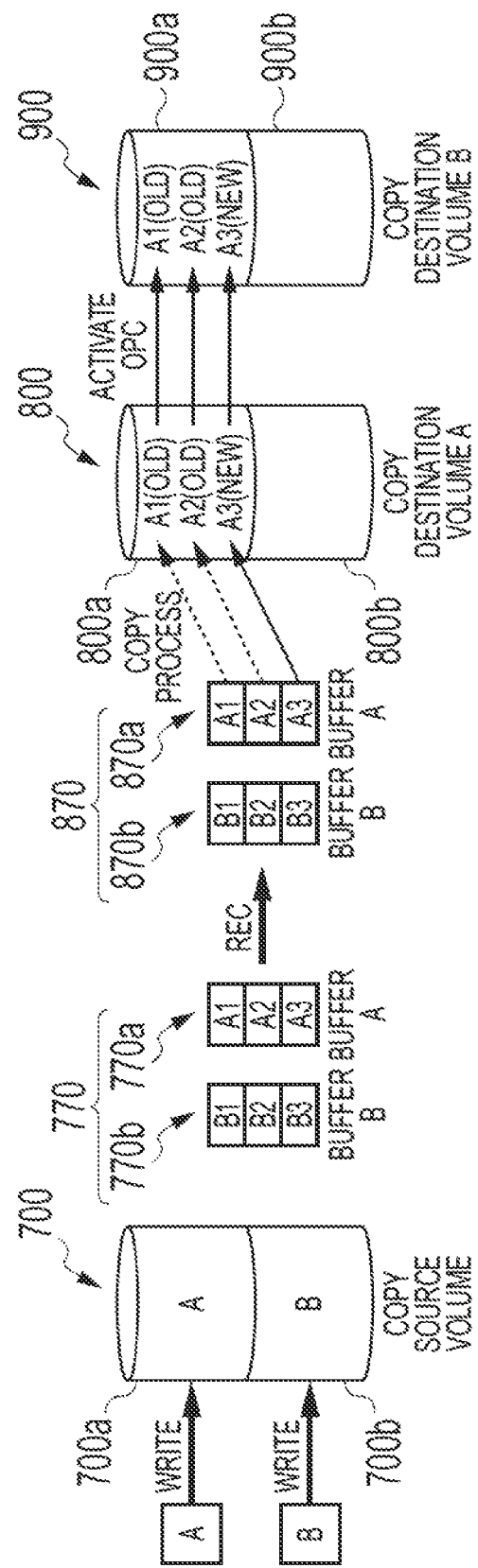
FIG. 16 illustrates a state in which a copy process of data stored in buffers to the copy destination volume is not synchronized with an activation of the OPC.

More specifically, assume that data A stored in the buffer 770a contains a plurality of pieces of data A1 to A3 and data B stored in the buffer 770b contains a plurality of pieces of data B1 to B3 as well. When these pieces of data A1 to A3 and data B1 to B3 are received in units of buffer segments, the copy destination performs a copy process to the copy destination volume A 800 in units of buffer segments. At this time, when a backup by OPC is activated, the copy destination backs up data stored in the volume A 800 regardless of the copy process from the buffer 870 to the copy destination volume A 800. That is, the copy destination may perform a backup process to the volume B 900 before the copy process of the data A1 and data A2 is not completed. In this case, as illustrated in FIG. 16, before update data A1 and data A2 are stored in the volume A 800, currently stored data (data A1 (OLD) and data A2 (OLD)) are stored in the volume B 900 as the update data, and thus the backup data may be meaningless.

Therefore, optimization of the backup process when dual backups are performed on the copy data acquired from the copy source in the copy destination is demanded.

Hereinafter, the outline of the storage system in accordance with the present embodiment will be described by referring to drawings. FIG. 1 explains a process flow of the storage system in accordance with the present embodiment. The storage system in accordance with the present embodiment copies data stored in a storage apparatus of a copy source to a storage apparatus of a copy destination through a communication path as well as performs dual backups of data acquired from the storage apparatus of the copy source in the storage apparatus of the copy destination.

Here, the storage system in accordance with the present embodiment performs remote copy using REC as a method of copying data from a storage apparatus of the copy source (hereinafter referred to simply as "copy source") to a storage apparatus of the copy destination (hereinafter referred to simply as "copy destination"). The REC is a method of copying data stored in a storage apparatus to another storage apparatus installed in a remote site.

Specifically, as illustrated in FIG. 1, during REC execution, for example, when an instruction to write data A and data B is acquired, the copy source writes data to a copy source volume 70. At this time, the copy source memorizes which region of data is updated in what sequence.

When the process of writing this data is completed, the copy source reads the data updated by the writing process from the copy source volume 70, and then stores this data in a sending buffer 77 in the update sequence. More specifically, when data is written to the copy source volume 70 in the sequence from data A to data B, the copy source first stores data A in a sending buffer segment A 77a (hereinafter referred to simply as "buffer 77a"). At this time, data A contains data A1 to A3.

Then, when the sending buffer A 77a becomes full or a specific time has elapsed since the first storing started, the copy source stops storing data in the sending buffer A 77a, and fixes a block of data to be copied to the copy destination. Then, the copy source switches to another sending buffer segment B 77b (hereinafter referred to simply as "buffer 77b") to resume storing. More specifically, when the sending buffer A becomes full by storing data A1 to A3, the copy source switches the sending buffers 77 from the sending buffer A 77a to the sending buffer B 77b and starts storing next data or data B. Note that at this time, data B contains data B1 to B3.

The copy destination acquires data (hereinafter referred to simply as "copy data") transferred from the copy source through a communication path. Then, the copy destination stores the acquired copy data in a receiving buffer 87 in the acquired sequence. More specifically, when copy data is acquired from the copy source in the sequence from data A to data B, the copy destination stores these pieces of data in the receiving buffer 87 in the sequence from data A to data B. Next, the copy destination transfers the copy data stored in the receiving buffer 87 to a copy destination volume A 80 in the stored sequence. More specifically, the copy destination first transfers data A1 to A3 stored in the receiving buffer A 87a to the copy destination volume A 80. Then, when this copy process is completed, the copy destination switches to another receiving buffer or a receiving buffer B 87b and transfers data B1 to B3 to the copy destination volume A 80. Note that hereinafter copy data stored in the receiving buffer 87 may be referred as buffer data.

Further, the copy destination backs up the copy data stored in the copy destination volume. Specifically, the copy destination performs a backup process using OPC. The OPC is a process of generating replicated data (snapshot) at a predetermined point of time of the data to be backed up when a backup is performed. That is, according to the present embodiment, the copy destination generates a snapshot of the data stored in the copy destination volume A 80 in a copy destination volume B 90.

Here, according to the present embodiment, the backup process to the copy destination volume B 90 is performed after the copy process of transferring the buffer data from the receiving buffer A 87a to the copy destination volume A 80 is completed and during the process of switching to a next receiving buffer B 87b. That is, the copy destination completes transferring all the data A1 to A3 stored in the receiving buffer A 87a to the copy destination volume A 80, and then activates the OPC as well as switches to another receiving buffer or a receiving buffer B 87b. As described above, the backup process using OPC is performed during the process of switching the receiving buffers.

In this manner, the storage system in accordance with the present embodiment synchronizes between the copy process of transferring copy data to the copy destination volume A 80 and the process of backing up the copy data to the copy destination volume B 90. This method of performing a backup process during the copy process of transferring copy data may prevent a situation where the data backed up in the copy destination volume B 90 does not match the data stored in the copy destination volume A 80.

Figure 2:
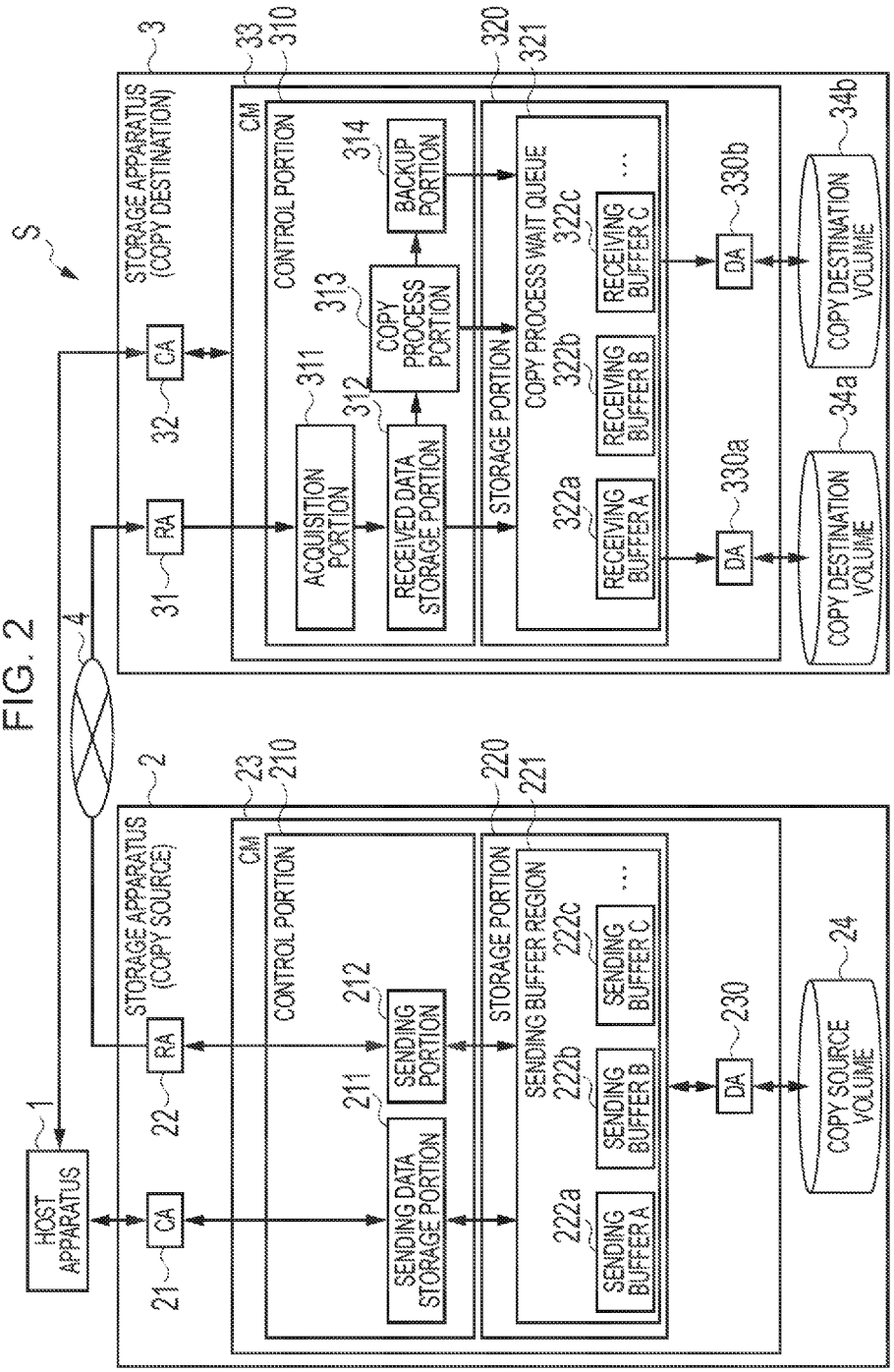
FIG. 2 is a block diagram illustrating a configuration of the storage system.

Next, the configuration of the storage system in accordance with the present embodiment will be specifically described by referring to drawings. FIG. 2 is a block diagram illustrating the configuration of the storage system in accordance with the present embodiment. As illustrated in FIG. 2, the storage system S in accordance with the present embodiment includes a host apparatus 1, a copy source storage apparatus 2 (copy source 2), and a copy destination storage apparatus 3 (copy destination 3). The copy source 2 is mutually connected to the copy destination 3 through a network 4 serving as a communication path. A remote copy using REC is performed through this network 4. Examples of the network 4 include the Internet, LAN, WAN, and the like.

The host apparatus 1 is a device used by an operator, for example, corresponding to a computer terminal used by a user who manages the copy source 2. The copy source 2 includes a CA (Channel Adapter) 21, an RA (Remote Adapter) 22, a CM (Centralized Module) 23, and a copy source volume 24.

The CA 21 serves as an interface (I/F) control portion to and from the host apparatus 1 and controls sending and receiving information to and from the host apparatus 1. The copy source 2 uses this CA 21 acquires not only an instruction to write data, but also other instructions to execute a remote copy using REC, a backup by OPC, and the like. The RA 22 serves as an interface (I/F) control portion to and from the copy destination 3 and controls transferring copy data to and from the copy destination 3.

Examples of the copy source volume 24 include an HDD (Hard Disk Drive), an MO disk (Magneto Optical Disk) and other disk devices to store various kinds of data therein. This copy source volume 24 corresponds to a data storage unit. It is noted that the copy source volume 24 may be any device as long as the device may store data, and is not limited to a disk device.

The CM 23 mainly serves as a processing portion executing a REC remote copy process and includes a control portion 210, a storage portion 220, and a DA (Disk Adapter) 230. The storage portion 220 serves as a cache or the like and includes a sending buffer region 221 which includes a plurality of sending buffer segments 222a,222b and 222c (hereinafter referred to simply as "buffers 222a,222b and 222c"). The sending buffers 222a to 222c are a storage region in which data to be transferred to the copy destination 3 is temporarily stored. The DA 230 serves as an I/F control portion to and from the copy source volume 24, and is used when data is written to the copy source volume 24 in response to a write instruction from the host apparatus 1 or the written data is stored in one of the sending buffers 222a to 222c.

The control portion 210 controls the entire copy source 2. This control portion 210 includes a sending data storage portion 211 and a sending portion 212. The sending data storage portion 211 functions as a sending data storage unit, and stores data updated by data writing process or the like by the host apparatus 1 of the data stored in the copy source volume 24, in one of the sending buffers 222a to 222c in the update sequence. The sending portion 212 functions as a sending unit, and sends the data stored in the sending buffers 222a to 222c by the sending data storage portion 211 to the copy destination 3 through the network 4 in the update sequence.

The copy destination 3 includes an RA (Remote Adapter) 31, a CA (Channel Adapter) 32, a CM (Centralized Module) 33, and copy destination volumes 34a and 34b. The RA 31 serves as an I/F control portion to and from the copy source 2 and controls receiving copy data from the copy source 2. The CA 32 serves as an I/F control portion to and from the host apparatus 1 and controls sending and receiving information to and from the host apparatus 1. It is noted that the copy destination 3 may be connected to the host apparatus 1 through the network 4 or other communication path.

Examples of the copy destination volumes 34a and 34b include an HDD (Hard Disk Drive), an MO disk (Magneto Optical Disk) and other disk devices to store various kinds of data therein. It is noted that the copy destination volumes 34a and 34b may be any device as long as the device may store data, and is not limited to a disk device. According to the present embodiment, the copy destination volume 34a corresponds to a copy data storage unit and stores copy data transferred from the copy source 2. In addition, the copy destination volume 34b corresponds to a backup data storage unit and stores backup data of the copy data stored in the copy destination volume 34a.

The CM 33 mainly serves as a processing portion executing a copy process and a backup process, and corresponds to a backup control apparatus. This CM 33 includes a control portion 310, a storage portion 320, and DAs (Disk Adapters) 330a and 330b. The storage portion 320 serves as a cache or the like. This storage portion 320 has a copy process wait queue 321. This copy process wait queue 321 includes a plurality of receiving buffer segments 322a 322b and 322c (hereinafter referred to simply as "buffer 322a, 322b and 322c"). The receiving buffers 322a to 322c are a storage region in which copy data received from the copy source 2 is temporarily stored. The DAs 330a and 330b each serve as an I/F control portion to and from the copy destination volume A 34a and the copy destination volume B 34b respectively.

The control portion 310 controls the entire copy destination 3. This control portion 310 includes an acquisition portion 311, a received data storage portion 312, a copy process portion 313, and a backup portion 314. The acquisition portion 311 functions as an acquisition unit and acquires copy data transferred from the copy source 2 through the network 4 and the RA 31.

Figure 3:
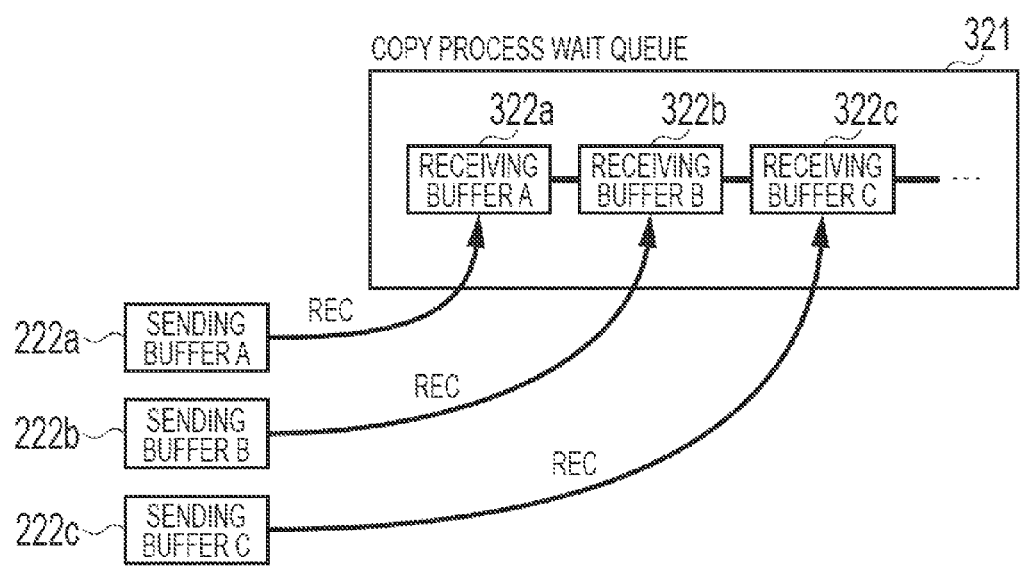
FIG. 3 illustrates a state in which copy data acquired from the storage apparatus of the copy source is stored in a copy process wait queue.

The received data storage portion 312 functions as a received data storage unit and stores the copy data acquired from the acquisition portion 311 in the receiving buffers 322a to 322c. Here, the process of storing copy data by this received data storage portion 312 will be described by referring to another drawing. FIG. 3 illustrates a state in which copy data acquired from the storage apparatus of the copy source is stored in the copy process wait queue.

The received data storage portion 312 stores copy data acquired from the copy source 2 in the receiving buffers 322a to 322c in the acquired sequence. Specifically, as illustrated in FIG. 3, when the acquisition portion 311 acquires data stored in the sending buffer A 222a, the received data storage portion 312 stores the acquired copy data in the first receiving buffer A 322a in the copy process wait queue 321. Then, when the acquisition portion 311 acquires data stored in the sending buffer B 222b, the received data storage portion 312 stores data stored in the sending buffer B 222b in a next receiving buffer B 322b in the copy process wait queue 321. Then, when the acquisition portion 311 acquires data stored in the sending buffer C 222c, the received data storage portion 312 stores the acquired copy data in a next receiving buffer C 322c in the copy process wait queue 321.

Figure 4:
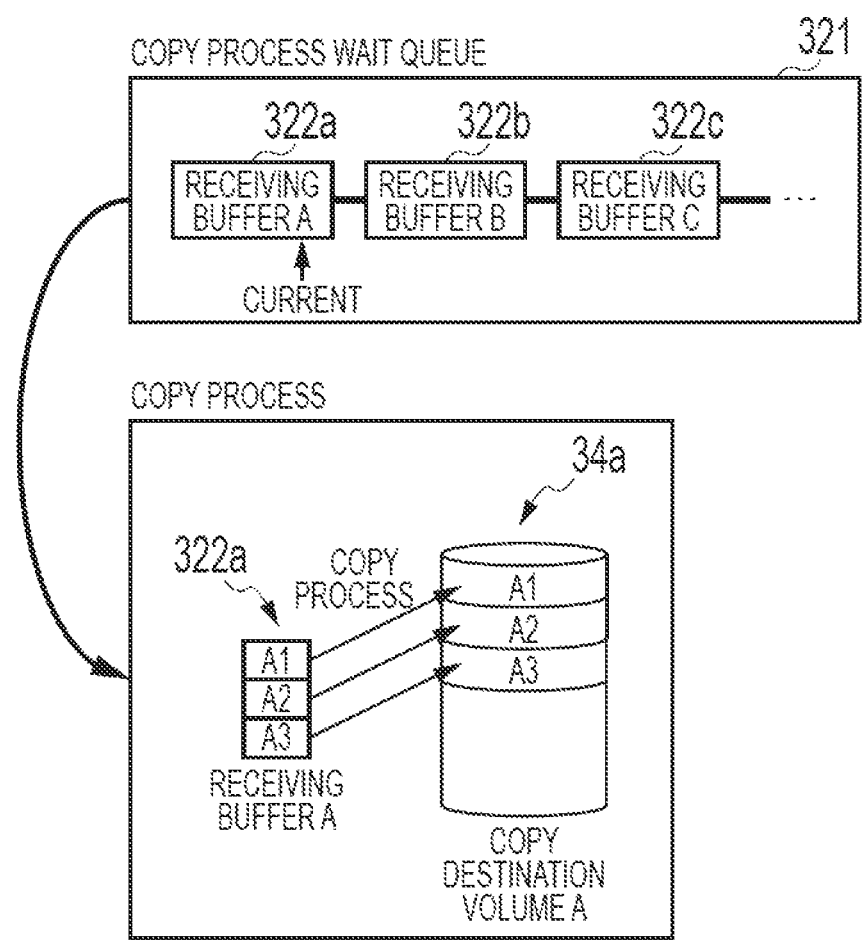
FIG. 4 illustrates a state in which a current receiving buffer is fetched from the copy process wait queue to perform a copy process.
Figure 5:
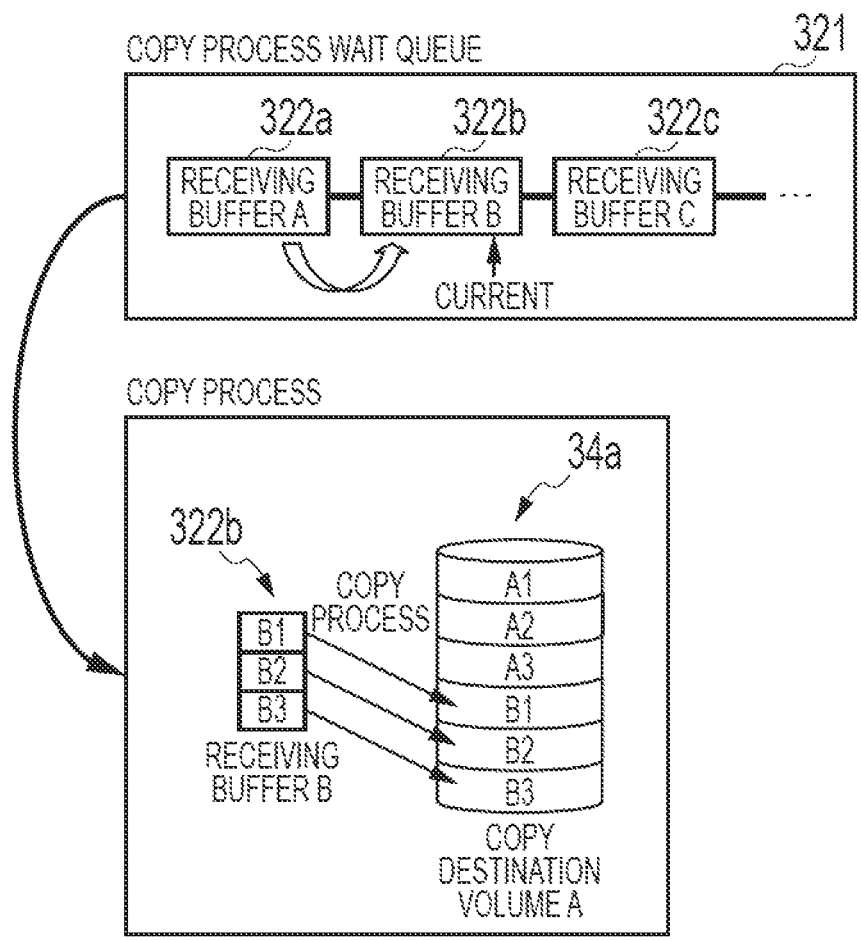
FIG. 5 illustrates a state in which current receiving buffers in the copy process wait queue are switched.

The copy process portion 313 functions as a copy process unit, fetches (selects) one of the receiving buffers 322a to 322c in a sequence in which copy data was stored, and transfers the buffer data stored in the fetched receiving buffer 322 to the copy destination volume A 34a. Here, the copy process of transferring from the receiving buffer to the copy destination volume A 34a by the copy process portion 313 will be described by referring to other drawings. FIG. 4 illustrates a state in which a current receiving buffer 322a is fetched from the copy process wait queue 321 to perform an expansion process. FIG. 5 illustrates a state in which current receiving buffers 322b in the buffer copy process wait queue 321 are switched.

When the copy process is performed, the copy process portion 313 first fetches the first receiving buffer A 322a from within the receiving buffers 322a to 322c in the copy process wait queue 321 as a buffer (current buffer) to be executed. Then, the copy process portion 313 transfers copy data (buffer data) A1 to A3 stored in the receiving buffer 322a to the copy destination volume A 34a.

When the copy process of transferring copy data A to the copy destination volume A 34a is completed, the copy process portion 313 switches from the already-executed receiving buffer A 322a to a next-to-be-executed receiving buffer B 322b. More specifically, the process of transferring copy data A to the copy destination volume A 34a is completed, the copy process portion 313 fetches a next receiving buffer 322b as the current receiving buffer and transfers the buffer data stored in the receiving buffer 322b to the copy destination volume A 34a. Then, as illustrated in FIG. 5, the current receiving buffer switches from the receiving buffer A 322a to the receiving buffer B 322b.

As described above, the storage system S in accordance with the present embodiment performs a remote copy using the sending buffers and the receiving buffers between the copy source 2 and the copy destination 3 as the REC function and thereby may copy the data stored in the copy source 2 to the copy destination 3 by guaranteeing sequentiality.

The backup portion 314 functions as a backup unit, and backs up the buffer data stored to the copy destination volume A 34a to the copy destination volume 34b. In particular, according to the present embodiment, the backup portion 314 performs this backup process after the copy process portion 313 transfers all the buffer data stored in the receiving buffers to the copy destination volume A 34a. Note that when the copy process of the buffer data is completed, the copy process portion 313 switches to the buffer data stored in a next receiving buffer 322b independently of the backup process by the backup portion 314.

That is, when the process of transferring the data from the receiving buffer A 322a to the copy destination volume A 34a is completed, the backup portion 314 activates OPC. Thereby, the data (i.e., buffer data A1 to A3 stored in the receiving buffer A 322a) stored in the copy destination volume A 34a is backed up to the copy destination volume B 34b. Note that during this backup process, the process of switching to a next receiving buffer B 322b by the copy process portion 313 is performed in parallel.

Figure 6:
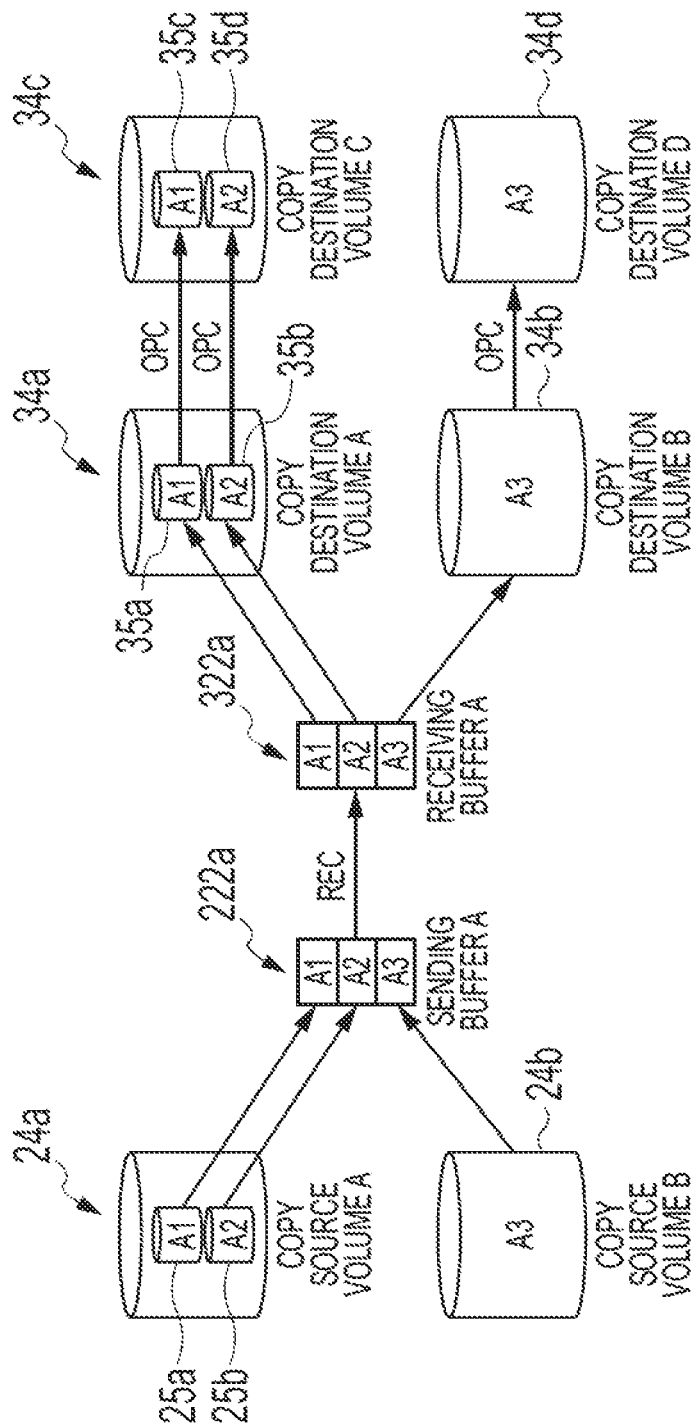
FIG. 6 illustrates a state in which a plurality of OPCs is simultaneously activated to back up copy data.

Here, if the buffer data stored in the copy destination volume contains data each stored in a plurality of physical volumes in the copy source 2, the backup portion 314 executes a backup process on the buffer data for each of the plurality of copy destination volumes corresponding to the plurality of physical volumes. Alternatively, if the buffer data stored in the copy destination volume contains data each stored in a plurality of logical volumes allocated to one physical volume in the copy source 2, the backup portion 314 executes a backup process on the buffer data for each logical volume allocated to the copy destination volume corresponding to the plurality of logical volumes. Hereinafter, such a process will be described by referring to another drawing. FIG. 6 illustrates a state in which a plurality of OPCs is simultaneously activated to back up copy data.

That is, for example, as illustrated in FIG. 6, assume that the copy source 2 has two copy source volumes 24a and 24b as the physical volume, and two logical volumes 25a and 25b are allocated to the copy source volume 24a. Then, assume that the host apparatus 1 writes data A1 to the logical volume 25a of the copy source volume 24a, and writes data A2 to the logical volume 25b thereof.

In such a case, when copy data A1 to A3 are acquired from the copy source, the copy process portion 313 stores these pieces of copy data A1 to A3 to a volume corresponding in the volume in which these pieces of copy data A1 to A3 are stored in the copy source 2. Specifically, the copy process portion 313 stores data A1 in a logical volume 35a corresponding to the logical volume 25a in which data A1 is stored. In addition, the copy process portion 313 stores data A2 to a logical volume 35b corresponding to the logical volume 25b in which data A2 is stored. Likewise, the copy process portion 313 stores data A3 to a copy destination volume 34b corresponding to the copy source volume 24b in which data A3 is stored.

Then, the backup portion 314 simultaneously executes backup processes on the copy data A1 to A3 stored in the logical volumes 35a and 35b and the copy destination volume 34b. More specifically, the backup portion 314 simultaneously executes an activation of OPC for backing up copy data A1 to the logical volume 35c, an activation of OPC for backing up copy data A2 to the logical volume 35d, and an activation of OPC for backing up copy data A3 to the copy destination volume D 34d. Note that the logical volume 35c of the copy destination volume C 34c corresponds to the logical volume 35a of the copy destination volume A 34a, the logical volume 35d of the copy destination volume C 34c corresponds to the logical volume 35b of the copy destination volume A 34a, and the copy destination volume D 34d corresponds to the copy destination volume B 34b.

In this manner, according to the present embodiment, when data stored in a plurality of logical volumes allocated to one physical volume in the copy source 2 or data stored in a plurality of physical volumes in the copy source 2 is to be backed up, the backup processes are duplicatedly performed on these pieces of data. This method may reduce the time used for a backup process of copy data stored in one of the receiving buffers 322a to 322c. It is noted that according to the present embodiment, the timing of starting these backup processes (timing of activating OPC) is described as "simultaneous", but the timing is not necessarily simultaneous, but OPC may be executed in such a timing as each backup process is executed by multiplex. Note that the time used for the backup processes may be minimized by simultaneously activating OPCs.

Figure 7:
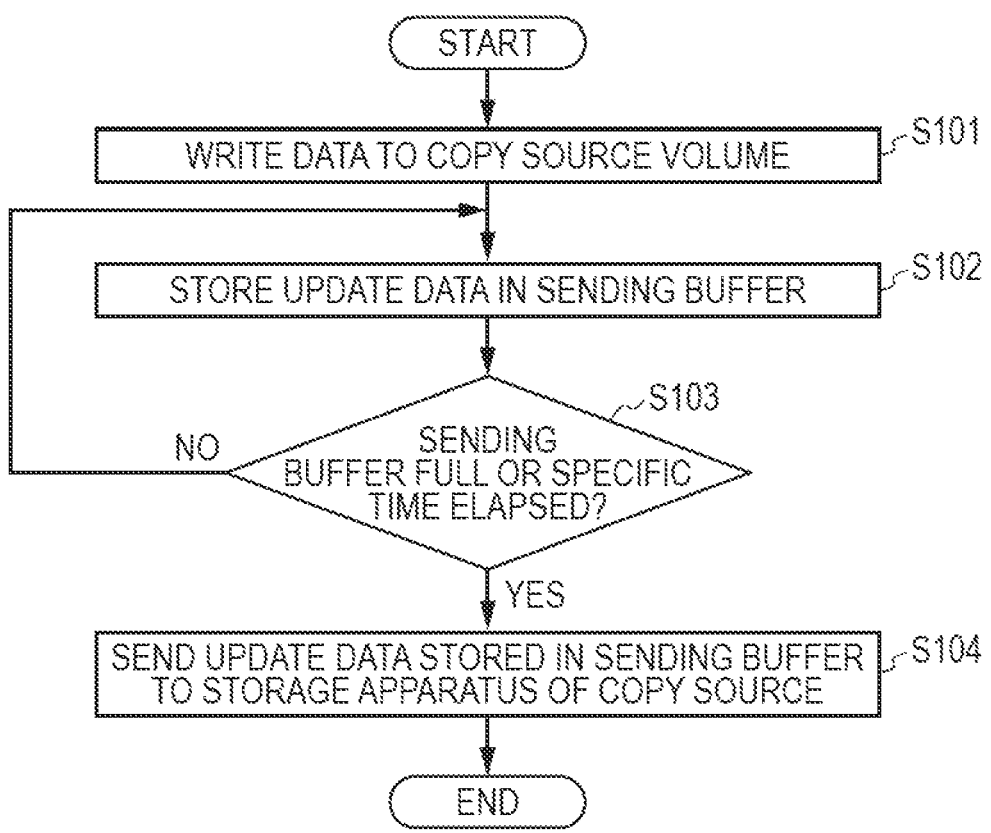
FIG. 7 is a flowchart illustrating a process procedure of the storage apparatus of the copy source.

Next, a specific operation of the copy source 2 in accordance with the present embodiment will be specifically described by referring to another drawing. FIG. 7 is a flowchart illustrating a process procedure of the storage apparatus 2 of the copy source in accordance with the present embodiment. Note that the following process focuses only on the data remote copy using REC of the various operations executed by the copy source 2.

As illustrated in FIG. 7, when an instruction to write data is received from the host apparatus 1, the control portion 210 of the copy source 2 writes data to the copy source volume 24 based on the write instruction (Operation S101). At this time, the control portion 210 stores, in a predetermined region of the storage portion 220, the information indicating that the data stored in which region of the copy source volume 24 is updated in what sequence. Then, the sending data storage portion 211 reads the data updated by the write process in Operation S101 from the copy source volume, and stores the data in one of the sending buffers 222a to 222c in the update sequence (Operation S102).

Then, the control portion 210 determines whether or not the sending buffer becomes full or a specific time has elapsed since the first storing started (Operation S103). In this process, if the sending buffer is not full and a specific time has not elapsed since the first storing started (Operation S103: No), the control portion 210 returns the process to Operation S102. Meanwhile, if a determination is made that the sending buffer becomes full or a specific time has elapsed since the first storing started (Operation S103: Yes), the sending data storage portion 211 stops storing data in the sending buffer and fixes a block of data to be copied to the copy destination, and proceeds the process to Operation S104. Then, in Operation S104, the sending portion 212 sends the update data stored in the sending buffer to the copy source 3 through the RA 22 and the network 4 (Operation S104).

Figure 8:
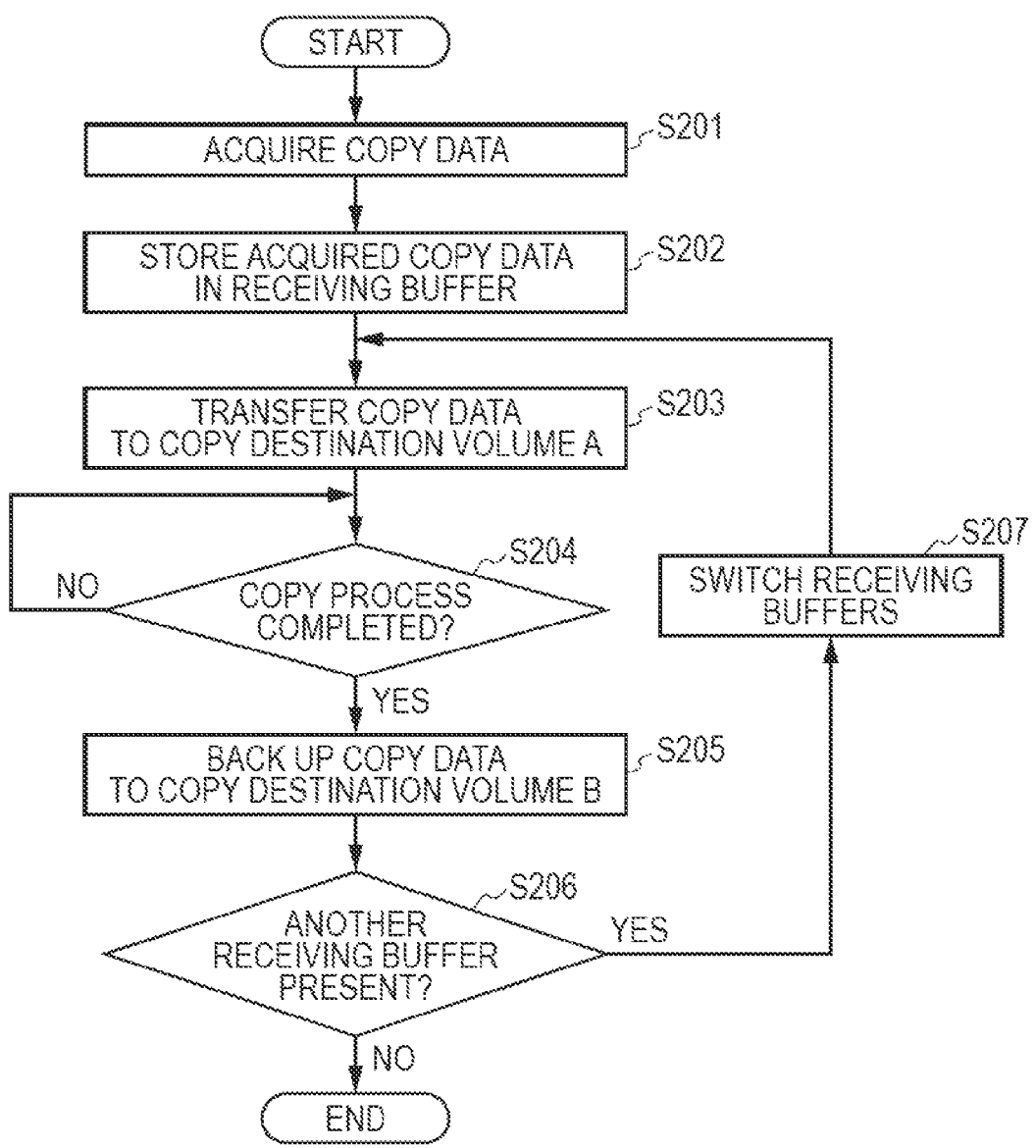
FIG. 8 is a flowchart illustrating a process procedure of a CM provided in the storage apparatus of the copy destination.

Then, a specific operation of the copy destination in accordance with the present embodiment will be specifically described by referring to another drawing. FIG. 8 is a flowchart illustrating a process procedure of a CM 33 provided in the storage apparatus 3 of the copy destination in accordance with the present embodiment. Note that the following process focuses only on the process of transferring from the receiving buffers 322a to 322c and backing up copy data of the various operations executed by the copy destination 3.

As illustrated in FIG. 8, the acquisition portion 311 acquires the update data (i.e., copy data) transferred from the copy source through the network 4 and RA 31 (Operation S201). Then, the received data storage portion 312 stores the copy data acquired by the acquired sequence in the receiving buffers 322 (Operation S202).

Then, the copy process portion 313 transfers the copy data stored in one of the receiving buffers 322a to 322c to the copy destination volume A 34a in the stored sequence (Operation S203). Then, the copy process portion 313 determines whether or not the copy process in Operation S203 is completed (Operation S204). If a determination is made in this process that the copy process is completed (Operation S204: Yes), the backup portion 314 backs up the copy data stored in the copy destination volume A to the copy destination volume B (Operation S205).

In addition, after the backup process in Operation S205 starts, the copy process portion 313 determines whether or not another receiving buffer storing copy data is present in the copy process wait queue 321 (Operation S206). If a determination is made in this process that there is another receiving buffer (Operation S206: Yes), the copy process portion 313 switches to a next receiving buffer in the copy process wait queue 321 (Operation S207). When this process is completed, the CM 33 returns the process to Operation S203 and starts the process of transferring from the receiving buffer switched in Operation S207.

As described above, according to the storage system in accordance with the present embodiment, the copy process of transferring copy data to the copy destination volume A 34a by the copy process portion 313 is synchronized with the backup process of backing up copy data to the copy destination volume B 34b by the backup portion 314. This method may perform a backup process by guaranteeing sequentiality of the backup data without suspending the remote copy using REC when dual backups are performed on the copy data acquired from the copy source 2 in the copy destination 3.

Moreover, according to the storage system in accordance with the present embodiment, the backup process of backing up copy data by the backup portion 314 is performed between after the copy process of transferring from a receiving buffer 322 by the copy process portion 313 completes and before the copy process of transferring from a next receiving buffer 322 starts. This method may guarantee the sequentiality of the backup data and may optimize the timing of starting the backup process.

Figure 9:
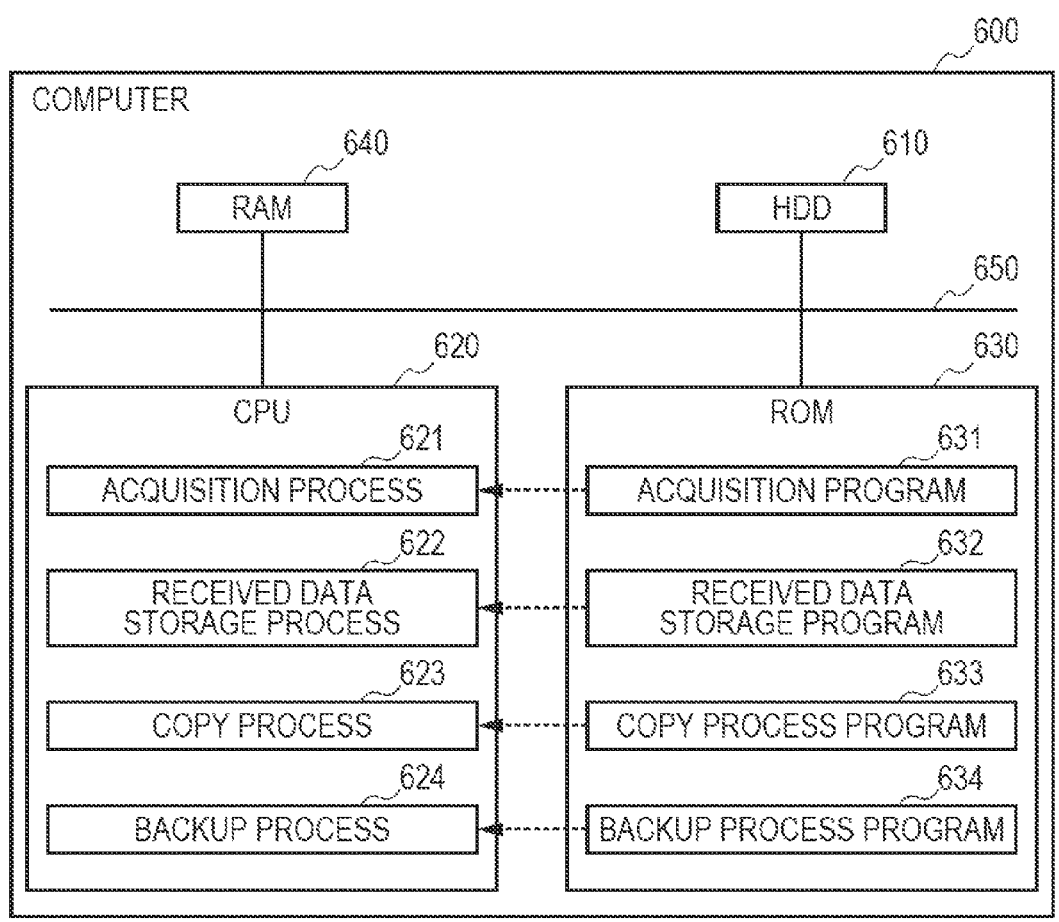
FIG. 9 illustrates a computer executing backup programs.

Meanwhile, the various processes described in the above embodiments may also be implemented by causing a computer to execute preliminarily prepared programs. In light of this, hereinafter, by referring to FIG. 9, an example of a computer executing backup programs having the same functions as the CM 33 in the copy destination 3 illustrated in the above embodiments will be described. FIG. 9 illustrates a computer executing the backup programs.

As illustrated in FIG. 9, a computer 600 serving as the CM 33 is configured to include an HDD 610, a CPU 620, a ROM 630 and a RAM 640 which are connected through a bus 650.

The ROM 630 preliminarily stores backup programs exerting the same functions as those in the above embodiments, that is, an acquisition program 631, a received data storage program 632, a copy process program 633, and a backup process program 634 as illustrated in FIG. 9.

When the CPU 620 reads these programs 631 to 634 from the ROM 630 and executes them, each of the programs 631 to 634 functions as an acquisition process 621, a received data storage process 622, a copy process 623, and a backup process 624 respectively. In this manner, the CPU 620 corresponds to the CM 33 illustrated in FIG. 2.

Note that the HDD 610 stores various kinds of data to be used by the processes 621 to 624. The CPU 620 reads various kinds of data stored in the HDD 610 and stores them in the RAM 640. The processes 621 to 624 use the various kinds of data stored in the RAM 640 to execute various processes such as a backup process.

The storage system, the backup storage apparatus and method disclosed in the present embodiment may optimize the backup process when dual backups are performed on the copy data acquired from the copy source in the copy destination.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:
1. A storage system comprising:
   a first storage apparatus to store data that has been sequentially updated; and
   a second storage apparatus to store a copy of the data stored in the first storage apparatus, the first storage apparatus comprising:
a first storage device to store a plurality of segments of the data that has been sequentially updated segment by segment, the segments of the data comprising a subset of the data;
a first buffer to receive a copy of the data from the first storage device and send the copy of the data to the second storage apparatus; and
a first controller to sequentially transfer a copy of a part of the segments of the data from the first storage device into the first buffer segment by segment in the same sequence as the segments of data have been updated in the first storage device and to control the first buffer to sequentially send the copy of the part of the segments of the data to the second storage apparatus segment by segment in the same sequence as the copy of the segments of data have been transferred to the first buffer,
the second storage apparatus comprising:
a second storage device to store a copy of the segments of the data stored in the first storage apparatus, the second storage device including a backup data storage portion to store a backup copy of the segments of the data;
a second buffer to receive the copy of the part of the segments of the data from the first buffer of the first storage apparatus and transferring the copy of the part of the segments of the data to the second storage device; and
a second controller to sequentially transfer the copy of the part of the segments of the data from the second buffer into the second storage device segment by segment in the same sequence as the second buffer have received the copy of the part of the segments of the data from the first buffer, the second controller producing a backup copy in the backup data storage portion by copying a copy of one of the segments of the data stored in the second storage device that has been transferred from the second buffer into the second storage device while transferring a copy of the subsequent segment of the data next to said one of the segments of the data in the sequence from the second buffer to the second storage device and while switching to another buffer, and the second controller generating replicated data, at a predetermined point of time, of the plurality of segments of data when the transfer is complete.

2. The storage system according to claim 1, wherein when the copy of the segments of the data stored in the second storage device contains data each stored in a plurality of data storage portions in the first storage apparatus, the second controller performs a backup copy in a plurality of backup data storage portions each corresponding to the plurality of data storage portions.

3. The storage system according to claim 1, wherein when the copy of the segments of the data stored in the second storage device contains data each stored in a plurality of logical storage portions allocated to one data storage portion in the first storage apparatus, the second controller performs a backup copy for each logical storage portion corresponding to the plurality of logical storage portions allocated to one backup storage portion.

4. The storage system according to claim 1, wherein the storage system is configured to use a Remote Equivalent Copy method.

5. The storage system according to claim 1, wherein the storage system is configured to use a One Point Copy method.

6. A backup storage apparatus to back up data stored in a first storage apparatus comprising:
a storage device to store a copy of segments of data stored in the first storage apparatus, the storage device including a backup data storage portion to store a backup copy of the segments of the data, the segments of the data comprising a subset of the data;
a buffer to receive the copy of the part of the segments of the data from the first storage apparatus and transferring the copy of the part of the segments of the data to the storage device; and
a controller to sequentially transfer the copy of the part of the segments of the data from the buffer segment by segment in the same sequence as the buffer have received the copy of the part of the segments of the data from the first storage apparatus, the controller producing a backup copy in the backup data storage portion by copying a copy of one of the segments of the data stored in the storage device that has been transferred from the buffer into the storage device while transferring a copy of the subsequent segment of the data next to the one of the segments of the data in the sequence from the buffer to the storage device and while switching to another buffer, and the controller generating replicated data, at a predetermined point of time, of the segments of data when the transfer is complete.

7. The backup storage apparatus according to claim 6, wherein
when the copy of the segments of the data stored in the second storage device contains data each stored in a plurality of data storage portions in the first storage apparatus, the controller performs a backup copy in a plurality of backup data storage portions each corresponding to the plurality of data storage portions.

8. The backup storage apparatus according to claim 6, wherein
when the copy of the segments of the data stored in the storage device contains data each stored in a plurality of logical storage portions allocated to one data storage portion in the first storage apparatus, the controller performs a backup copy for each logical storage portion corresponding to the plurality of logical storage portions allocated to one backup storage portion.

9. A backup control method comprising:
storing a plurality of segments of data that has been sequentially updated segment by segment in a first storage device of a first storage apparatus, the segments of the data comprising a subset of the data;
sequentially transferring a copy of a part of the segments of the data from the first storage device into a first buffer segment by segment in the same sequence as the segments of data have been updated in the first storage device;
controlling the first buffer to sequentially send the copy of the part of the segments of the data to the second storage apparatus segment by segment in the same sequence as the copy of the segments of data have been transferred to the first buffer;
receiving the copy of the part of the segments of the data from the first buffer of the first storage apparatus by a second buffer of a second storage apparatus;
transferring the copy of the part of the segments of the data from the second buffer into the second storage device segment by segment in the same sequence as the second buffer have received the copy of the part of the segments of the data from the first buffer;

producing a backup copy in the backup data storage portion by copying a copy of one of the segments of the data stored in the second storage device that has been transferred from the second buffer into the second storage device while transferring a copy of the subsequent segment of the data next to said one of the segments of the data in the sequence from the second buffer to the second storage device and while switching to another buffer; and generating replicated data, at a predetermined point of time, of the plurality of segments of data when the transferring is complete.

10. The backup control method according to claim 9, further comprising:

when the copy of the segments of the data stored in the second storage device contains data each stored in a plurality of data storage portions in the first storage apparatus, performing a backup copy in a plurality of backup data storage portions each corresponding to the plurality of data storage portions.

11. The backup control method according to claim 9, further comprising:

when the copy of the segments of the data stored in the second storage device contains data each stored in a plurality of logical storage portions allocated to one data storage portion in the first storage apparatus, performing a backup copy for each logical storage portion corresponding to the plurality of logical storage portions allocated to one backup storage portion.

12. The backup control method according to claim 9, wherein the backup data storage portion and the second storage device form a single storage.

13. The storage system according to claim 1, wherein the backup data storage portion and the second storage device form a single storage.

* * * * *